United States Patent
Gritter

(10) Patent No.: US 10,199,973 B2
(45) Date of Patent: Feb. 5, 2019

(54) ACCELERATION ESTIMATOR FOR SPEED RATE CONTROL

(71) Applicant: DRS Power & Control Technologies, Inc., Milwaukee, WI (US)

(72) Inventor: David J. Gritter, Wauwatosa, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 403 days.

(21) Appl. No.: 14/469,257

(22) Filed: Aug. 26, 2014

(65) Prior Publication Data

US 2016/0065110 A1  Mar. 3, 2016

(51) Int. Cl.
*B60W 40/11* (2012.01)
*H02P 6/18* (2016.01)
*H02P 23/20* (2016.01)
*H02P 23/00* (2016.01)
*G05B 19/00* (2006.01)

(52) U.S. Cl.
CPC .......... *H02P 23/0063* (2013.01); *G05B 19/00* (2013.01); *H02P 23/20* (2016.02); *H02P 2205/07* (2013.01)

(58) Field of Classification Search
CPC .............................. H02P 21/0089; H02P 21/06
See application file for complete search history.

(56) References Cited

U.S. PATENT DOCUMENTS

| 4,423,363 A | 12/1983 | Clark et al. | |
|---|---|---|---|
| 2010/0057284 A1* | 3/2010 | Tang | B60L 3/106 701/22 |
| 2011/0127938 A1* | 6/2011 | Kawakami | G01P 3/481 318/400.13 |
| 2012/0003010 A1* | 1/2012 | Birumachi | G03G 15/5004 399/167 |
| 2012/0296475 A1* | 11/2012 | Maekawa | B23Q 15/12 700/275 |
| 2013/0175969 A1* | 7/2013 | Kwon | H02P 31/00 318/590 |
| 2015/0381083 A1* | 12/2015 | Barrass | H02P 21/0089 318/400.15 |

* cited by examiner

*Primary Examiner* — Bickey Dhakal
*Assistant Examiner* — Charles S Laughlin
(74) *Attorney, Agent, or Firm* — Kilpatrick Townsend & Stockton LLP

(57) ABSTRACT

Embodiments of the present invention are directed to a controller that is configured to limit the rate of change of speed of a motor (e.g., the acceleration or deceleration) regardless of the operating mode of the motor (e.g., speed, torque, or power control mode). The controller can include an acceleration estimator which monitors the output speed of a motor and provides an acceleration-limited speed set point. The output of the acceleration estimator may be limited to a range of acceptable acceleration values that correspond to the required limits of acceleration and deceleration. The acceleration estimator can be configured such that it causes the speed regulator to override the torque and/or power regulators when the acceleration range is exceeded.

16 Claims, 5 Drawing Sheets

ACCELERATION ESTIMATOR FOR SPEED RATE CONTROL

BACKGROUND

Embodiments of the present invention are related to control systems and, in particular, to an acceleration estimator for speed rate control.

FIG. 1 shows a basic control system 100. A controller 102, can be used to regulate a plant 104, such as a motor, generator, or other system under control, based on a measurable output 106 of the plant. For example, a furnace controller may operate to maintain the output temperature of a furnace (e.g., the plant) at a preset temperature, or a motor controller may operate to maintain an output speed of a motor (e.g., the plant) at a preset speed. The output 106 of the plant can be fed back as feedback signal 108. Feedback signal 108 can be compared 110 to an input 112 (e.g., a desired output value) and the difference, error signal 114, can be input to controller 102. Based on the error signal 114, a control signal 116, can be provided to plant 104 to minimize the difference between the input 108 and the output 106, by increasing or decreasing the output 106, as needed.

In FIG. 1, a single output value is monitored and used for control. However, plants can be controlled in various ways based on the number of controllable inputs and outputs. For example, an electric motor may be controlled based on its speed, power, and/or torque. In such a case, a speed regulator, power regulator, and torque regulator may each monitor a corresponding output and provide a different control signal in response. A plant may be operated in different modes, depending on which controllable output is being controlled. For example, when a motor is operated in a speed control mode, the motor may be controlled to maintain an output speed at a preset value (e.g., based on the input 112), without controlling other controllable outputs.

However, problems occur where operating parameters of a plant need to be limited regardless of the mode in which it is operating, particularly where the operating parameters cannot be directly correlated with the output in each mode.

Embodiments of the invention address these and other problems.

SUMMARY

Embodiments of the present invention are directed to a controller that is configured to limit the rate of change of speed of a motor (e.g., the acceleration or deceleration) regardless of the operating mode of the motor (e.g., speed, torque, or power control mode). The controller can include an acceleration estimator which monitors the output speed of a motor and provides an acceleration-limited speed set point. The output of the acceleration estimator may be limited to a range of acceptable acceleration values that correspond to the required limits of acceleration and deceleration. The acceleration estimator can be configured such that it causes the speed regulator to override the torque and/or power regulators when the acceleration range is exceeded.

In accordance with an embodiment, an acceleration estimator may comprise a first regulator, configured to output values in a preset range, a second regulator, configured to output an override signal, and an integrator that receives the acceleration estimate from the first limiting regulator and outputs the estimated speed. The first regulator can be configured to receive an error signal representing the difference between an output speed of an electric motor and a speed estimate, and output the acceleration estimate, which is limited to the preset range.

In some embodiments, a system including the acceleration estimator may comprise an electric motor and a controller operable to receive a plurality of reference signals and a plurality of output signals from the electric motor, and further operable to output a control signal to the electric motor. The controller can include a plurality of regulators and an acceleration estimator. The acceleration estimator can be configured to receive an output speed signal from the electric motor; determine an acceleration estimate based on the output speed signal; determine that the acceleration estimate is outside a preset range; and calculate a speed set point based on the speed estimate at maximum acceleration value from the preset range.

In some embodiments, a method of acceleration-based speed control may comprise measuring, by a speed sensor, an output speed of a motor, and receiving, by an acceleration estimator, the output speed. The acceleration estimator may determine an acceleration estimate based on the output speed and may determine whether the acceleration estimate is outside a preset range. The acceleration estimator may further calculate a speed set point based on a maximum acceleration value from the preset range.

Additional embodiments and features are set forth in part in the description that follows, and in part will become apparent to those skilled in the art upon examination of the specification, or may be learned by the practice of the disclosed embodiments. The features and advantages of the disclosed embodiments can be realized and attained by means of the instrumentalities, combinations, and methods described in the specification.

Figure 1:
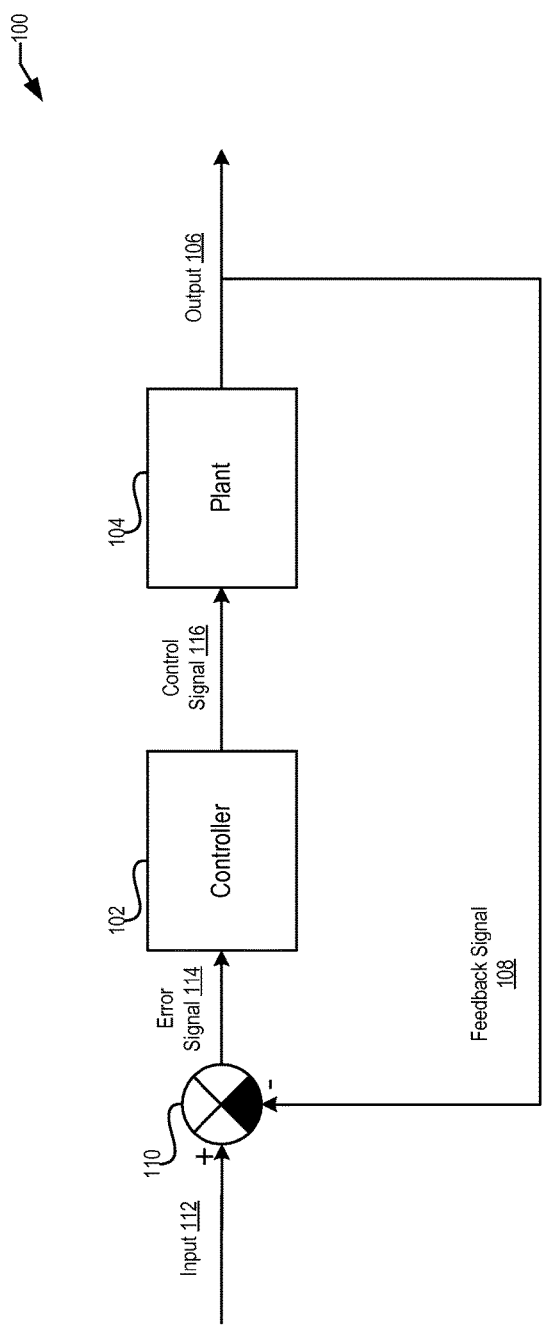
FIG. 1 shows a basic control system.

In the appended figures, similar components and/or features may have the same numerical reference label. Further, various components of the same type may be distinguished by following the reference by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Embodiments of the present invention are directed to acceleration-based speed control using an acceleration estimator.

Embodiments of the present invention are directed to a controller that is configured to limit the rate of change of speed of a motor (e.g., the acceleration or deceleration) regardless of the operating mode of the motor or the imposition of external disturbances to the motor load. The controller can include an acceleration estimator which monitors the output speed of a motor and provides an acceleration-limited speed set point. The output of the acceleration estimator may be limited to a range of acceptable acceleration values that correspond to the required limits of acceleration and deceleration.

In some embodiments, a motor may be controlled by a plurality of regulators including, e.g., a speed regulator, power regulator, and torque regulator. The regulators may be implemented as part of a blended control system that selects one of the regulators as the regulator in control of the system based on the outputs of each regulator. For example, a selector may identify the regulator demanding the lowest magnitude of motor current as the regulator in control of the system. The acceleration estimator can be configured such that it causes the speed regulator to override the torque and/or power regulators when the acceleration range is exceeded. As used herein, regulator may refer to any controller, such as a proportional-integral (PI) controller, proportional-integral-derivative (PID) controller, or any other controller known in the art. The regulators may be implemented in hardware or software, e.g., using analog or digital circuitry, microcontrollers, field programmable gate arrays (FPGA), programmable logic controllers, etc. Each regulator may be associated with a number of parameters, e.g., a PID controller may include three gain parameters, each associated with a different term of the controller. These parameters may be tuned, manually or automatically, based on the application of the regulator to achieve the desired response behavior.

In some embodiments, the acceleration estimator can override the blended control system. This allows the system to be controlled within the acceptable acceleration range under conditions where another regulator or external conditions have caused a deceleration that exceeds the acceptable range. For example, where the torque regulator sends a stop command to the motor (e.g., an output current of zero) but the load torque is sufficient to cause the motor to decelerate at a rate higher than allowable. The override signal can be based on the difference between the measured motor speed and the acceleration limited speed estimate from the acceleration estimator that ensures that deceleration of the motor is limited to the required rate.

Embodiments of the present invention alleviate the need to differentiate and filter a noisy velocity feedback signal. Instead, the integrated speed estimate (e.g., the output of integrator 312) is compared to the actual measured speed to drive a PI regulator 308 to produce an acceleration estimate 310. Additionally, embodiments of the present invention allow for acceleration to be controlled even when system dynamics and load are not well defined and/or are nonlinear. Typically, this would require the system to be carefully modeled, under various operating conditions, to correlate acceleration with other outputs, such as torque or power. However, such modeling can be complex and unreliable, particularly in view of changing operating conditions.

Figure 2:
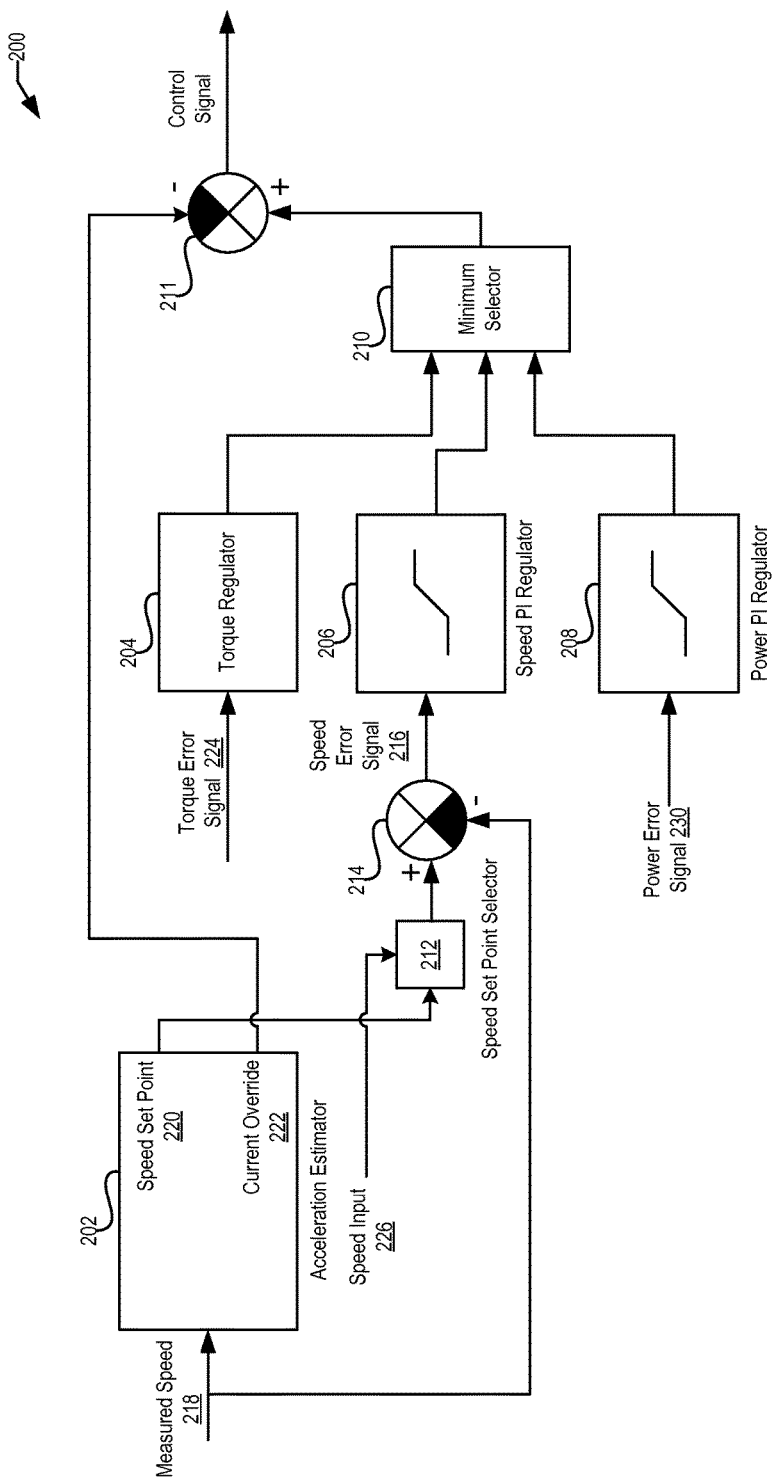
FIG. 2 shows a detailed view of a control system for providing acceleration-based speed control, in accordance with an embodiment of the invention.

FIG. 2 shows a detailed view of a control system 200 for providing acceleration-based speed control, in accordance with an embodiment of the invention. As shown in FIG. 2, an acceleration estimator 202 can be used in a blended control system that includes a plurality of controllers (also referred to herein as regulators) that are operable to control a motor based on one or more controllable outputs. For example, control system 200 may include a torque regulator 204, a speed regulator 206, and a power regulator 208. The output of each regulator may be an electrical signal received by a minimum selector 210 which selects the controller output signal having the lowest current magnitude to be used as the control signal for the motor.

As shown in FIG. 2, when operating in a particular control mode, a corresponding an input value (e.g., a reference signal) may be received which defines a set point for that regulator. The input value may be set by the system, by a user, or by any other entity. For example, when operating in speed control mode, speed regulator receives speed input 226. Each regulator may be associated with one or more sensors that determine the output of the motor at a given time. For example, one or more speed sensors (such as an inductive or optical speed sensor that produces an electrical signal output corresponding to the speed of a rotor). Torque and power sensors may similarly be used to measure an output power and torque of the motor. The measured output may be combined with the input value to determine an error signal (representing the difference between the measured output and the input) that is then provided to the regulator. For example, when in speed control mode, speed set point selector 212 selects speed input 226 to be received at a summing junction 214. Summing junction 214 can output the difference of the measured speed 218 and the speed input 226 (e.g., the speed error signal) to speed regulator 206. When no input value is provided (for example, when in speed control mode and no power or torque input value is provided) the error signal 216, 224, or 230, can be set to a small positive value. In some embodiments, a default reference signal may be input to a given regulator when operating in a different control mode. In either case, the error signal is such as to drive the inactive regulator outputs to their positive limited output so that minimum selector 210 chooses the output of the active regulator (for example the speed regulator when in speed control mode) which is below its positive limited output.

In the case of blended control, where, for example, both torque and power are constrained to limiting values in speed control mode, the default reference signals sent to the torque and power regulators are the limiting values. If these limiting set point values are exceeded by the feedback values, the associated regulator can reduce its output and the minimum selector 210 can cause, for example, the power regulator to override the speed regulator.

In accordance with an embodiment, when in torque or power control modes, speed set point selector 212 can select a speed set point signal 220 provided by estimator 202. As described further below, with respect to FIG. 3, acceleration estimator 202 can output an acceleration-limited speed set point. The speed set point signal 220 is limited by the acceleration estimator to increase at the maximum acceptable acceleration rate. When not under a limiting condition (e.g., when acceleration is within acceptable limits) the speed set point signal 220 tracks the measured speed with a small positive offset to ensure that the speed regulator output remains at its positive limit. Once acceleration exceeds the acceptable range, the speed set point signal 220 is limited to increasing at the maximum acceptable acceleration rate. As such, when the limiting condition is caused by high power or torque demands, the speed regulator output signal will be lower than the power or torque control signals, resulting in the speed regulator taking control of the motor and limiting the acceleration of the motor to the acceptable range.

As described above, when the acceleration estimator determines that the acceptable acceleration range has been exceeded, the acceleration estimator outputs a limited speed set point signal 220. In some embodiments, acceleration estimator 202 may also output a current override signal 222 based on the measured speed 218 of the motor. The current override signal 222 can be combined with the output of the minimum selector 210 (e.g., the lowest output of regulators 204-208) at summing junction 211 to reduce the control signal sent to the motor. This may be applicable where the limiting condition is caused by one or more of the regulators outputs being greatly reduced. For example, where a torque signal is reduced to zero (e.g., to stop the motor) the reduction in torque may lead to a deceleration rate that is lower than the acceptable range. Because the torque control signal is low, however, limiting the speed set point may not cause the speed regulator to take control of the motor. As such, the current override signal 222 is combined with the control signal at summing junction 211, reducing the control signal output to the motor and limiting the acceleration of the motor.

Although FIG. 2 shows a specific example of an acceleration-based speed control system, alternative embodiments may also be implemented. For example, additional regulators may be included, depending on the particular needs of the implementation environment. Further, although the regulators are shown in parallel, in some embodiments, the regulators may be implemented in series.

Figure 3:
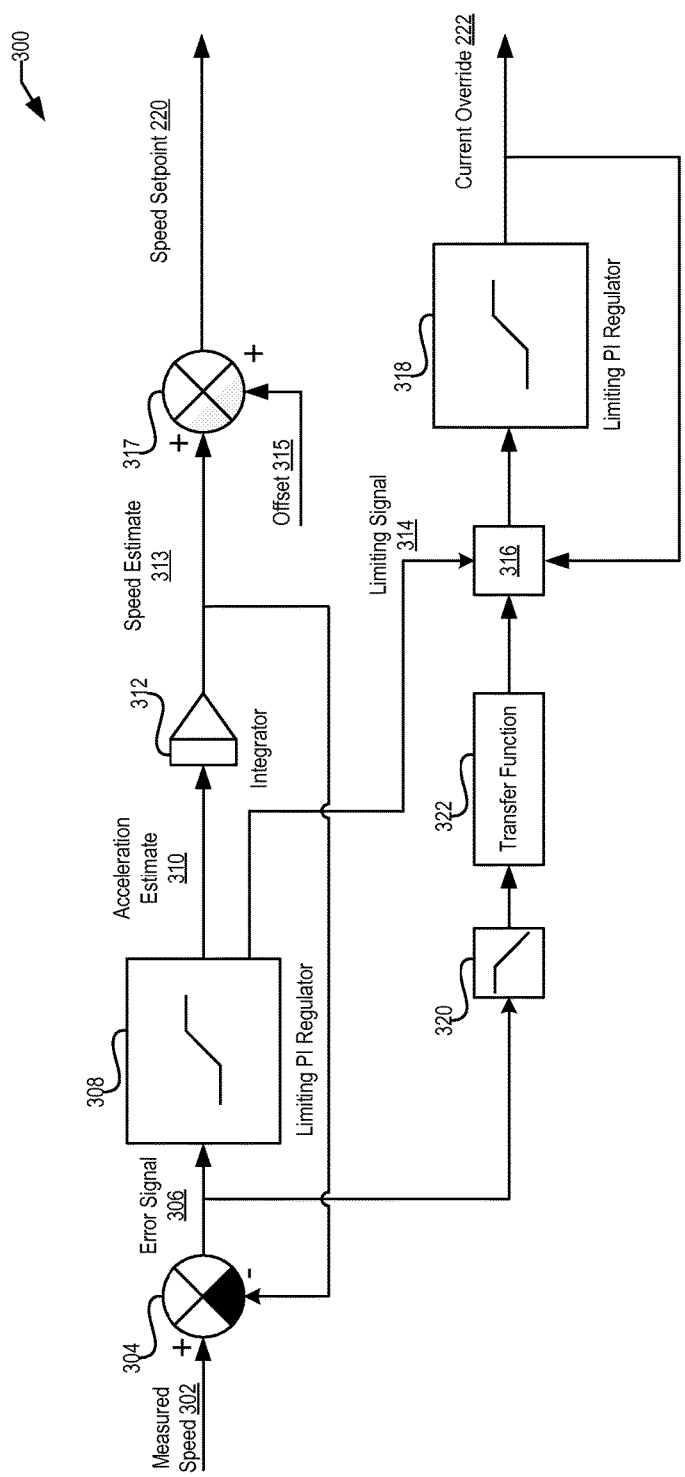
FIG. 3 shows a detailed view of an acceleration estimator, in accordance with an embodiment of the invention.

FIG. 3 shows a detailed view of an acceleration estimator 300, in accordance with an embodiment of the invention. As shown in FIG. 3, the measured speed 302 is received as input to acceleration estimator 300 and a speed set point 220 and current override 222 are output. The measured speed 302 is compared to the speed estimate 313 at summer 304 and error signal 306, representing the difference between the measured speed 302 and the speed set point 220 is output to a limiting regulator 308. Although PI (proportional-integral) regulators are depicted in FIG. 3, other regulators may also be used as is generally known in the art. The output of the limiting regulator 308 is an acceleration estimate 310. The limiting regulator 308 can be configured with an acceptable acceleration range, such as with a maximum and minimum acceleration value. If the acceleration estimate is within the acceptable range, then it is output to an integrator 312 that integrates the acceleration estimate 310 to determine the speed estimate 313. If the acceleration estimate is outside the acceptable range, then it is limited to the maximum (or minimum) acceleration value, which is then integrated by integrator 312 to determine the acceleration limited speed estimate 313.

In some embodiments, speed estimate 313 has a small offset 315 added (e.g., at summing junction 317) to it to become the speed set point 220 output of the acceleration estimator. This offset 315 can be added to ensure that speed regulator 216 in FIG. 2 remains at its positive limiting value unless an acceleration limiting response is needed.

In some embodiments, if the acceleration estimate 310 has been limited, limiting regulator 308 activates limiting signal 318. Limiting signal 314 may be a boolean signal having two values: a high value (e.g., 1) indicating a limiting condition, and a low value (e.g., 0) indicating no limiting condition. The limiting signal 314 may activate selector block 316 to change the input to a second limiting regulator 318. In a limiting condition, error signal 306 may be processed by a low pass filter 320 and/or a transfer function 322 to stabilize the error signal before it is passed to the second limiting regulator 318 to generate the current override signal 222. Error signal 306 is non-zero when the acceleration of the motor is above the acceptable range. The output of the second limiting regulator, current override signal 222 then becomes non-zero and continues to increase in value until acceleration has been limited to the acceptable range. Once the limiting condition has been resolved, the selector block 316 can feedback the negative of the current override signal 222 to limiting regulator 318, allowing the current override signal 322 to gradually return to zero. A feedback gain value can be tuned to control how quickly the current override signal 222 returns to zero.

In some embodiments, limiting regulator 318, which creates the current override signal 222, can be used as a secondary speed regulator. Thus it is possible to create an acceleration limited set of blended regulators without the need for the speed set point output 220 of the acceleration estimator. This feature is useful when the gain parameters of speed regulator 206 are set to a low value that would be ineffective at limiting acceleration. The gain parameters of regulator 318 may be set independently of, and significantly higher than, those of speed regulator 206, allowing for the effective gain of the system formed by the combination of regulator 318 and regulator 206 to be set at a value appropriate for limiting acceleration.

In accordance with an embodiment, integrator 312 may have its value limited to a finite value of estimated speed. In this embodiment, limiting regulator 318 serves as a secondary speed regulator that may be used to enforce a speed limit as well as an acceleration limit. For example, when integrator 312 reaches its speed estimate limit, error signal 306 becomes non zero, which drives regulator 308 to its limit, activating limiting signal 314. This in turn activates regulator 318 which provides an overriding current reference to regulate the actual motor speed to the limiting value of integrator 312.

Figure 4:
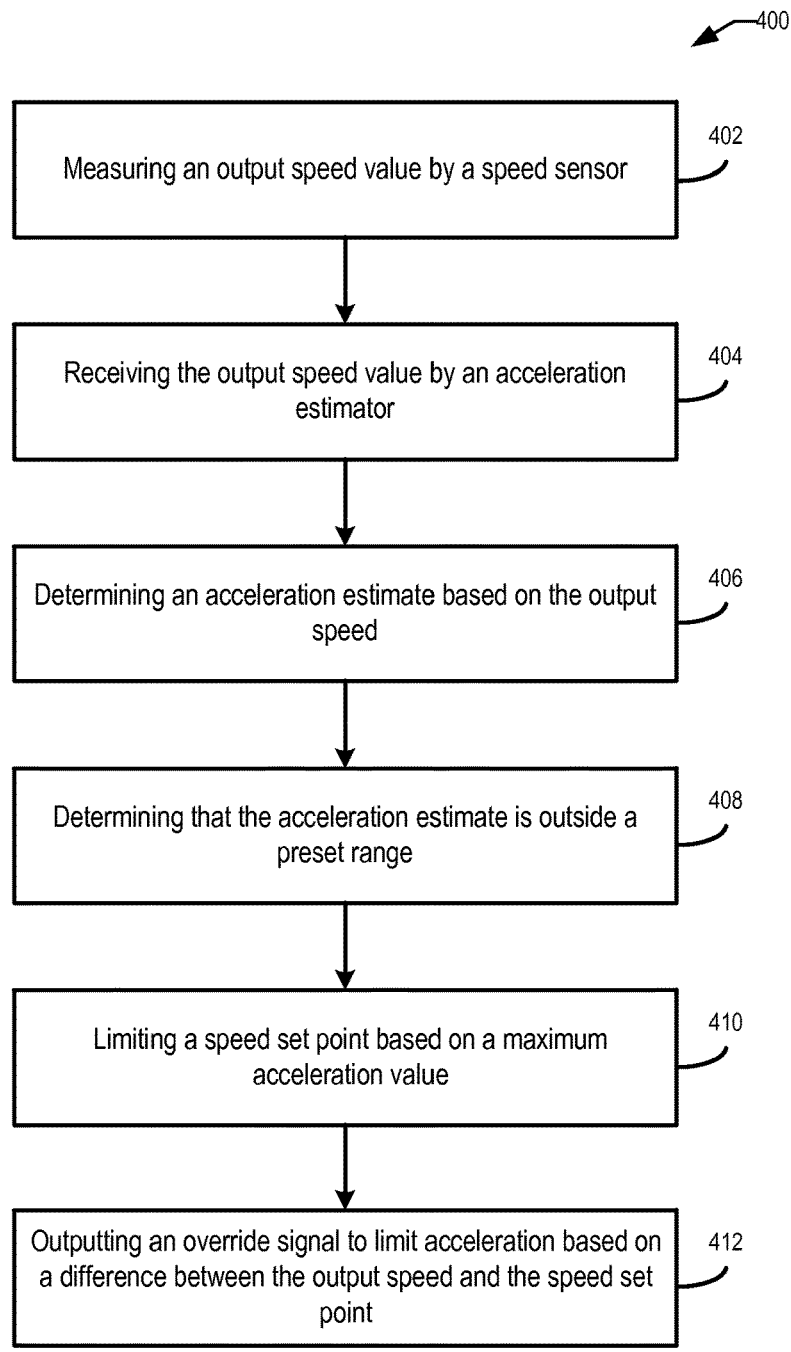
FIG. 4 shows a method of acceleration-based speed control, in accordance with an embodiment of the invention.

FIG. 4 shows a method 400 of acceleration-based speed control, in accordance with an embodiment of the invention.

At block 402, an output speed of a motor is measured. In accordance with an embodiment, the output speed may be measured by a speed sensor, such as an inductive or optical sensor configured to measure how quickly the rotor is spinning and output a voltage signal proportional thereto.

At block 404, an acceleration estimator receives the output speed. As described above, the measured output speed of the motor can be used as input to the acceleration estimator and may also be used as input, when combined with the speed set point output by the acceleration estimator, to a speed regulator, when operated in power or torque control mode.

At block 406, the acceleration estimator can determine an acceleration estimate based on the output speed. In some embodiments, the acceleration estimate may be determined by summing the measured output speed with the negative value of the speed set point calculated by the acceleration estimator and then passing the resulting error signal through a limiting regulator. The limiting regulator may output the acceleration estimate based on the error signal and the parameters of the limiting regulator.

At block 408 the acceleration estimator can determine that the acceleration estimate is outside a preset range. The preset range may correspond to a maximum and/or minimum value for acceleration. In some embodiments, the maximum and minimum acceleration values may have the same magnitude. The preset range may be programmed into the limiting regulator such that the limiting regulator outputs an acceleration estimate equal to the maximum acceleration value and activates an override signal to reduce the acceleration of the motor.

At block 410, the acceleration estimate may calculate a speed estimate based on a maximum acceleration value from the preset range. The speed estimate may be calculated by passing the acceleration estimate through an integrator. In some embodiments, a speed set point may be created by summing the speed estimate with a small positive offset.

In some embodiments, the acceleration estimator may further output an override signal to limit acceleration based on a difference between the output speed and the speed set point. Additionally, in some embodiments, the acceleration estimator may determine that the acceleration estimate is no longer outside a preset range; and reduce the override signal to zero over a first time period. The override signal may be reduced to zero by feeding back the negative of the override signal to the regulator outputting the override signal. The time it takes to reduce the signal to zero may then depend on the feedback gain of the regulator which may be tuned to ensure a smooth transition between limiting and non-limiting modes.

In some embodiments, a speed error signal based on the speed set point and the output speed may be determined and received by a speed regulator. The speed regulator may then output a speed control signal based on the speed error signal. The speed error signal may be determined while the motor is operated in torque or power control mode. While in speed control mode, the speed regulator may be driven by an error signal calculated based on a speed reference signal and the speed set point signal.

In some embodiments, the controller may be a blended control system including a plurality of regulators. A minimum selector module may receive the speed control signal and a plurality of different control signals, including a torque control signal and a power control signal. The minimum selector module may compare the speed control signal and the plurality of different control signals and, based on relative magnitudes of the speed control signal and the plurality of different control signals, select a control signal to output to the motor. In some embodiments, the acceleration estimator may output an override signal, the negative value of which is summed with the control signal at a summing junction prior to outputting the control signal to the motor. This enables the system to limit the acceleration of the motor even where the output of the speed regulator cannot be sufficiently reduced to take control of the motor. For example, in a torque control mode where the torque is commanded to zero and the sudden stop causes a deceleration outside the preset range.

Figure 5:
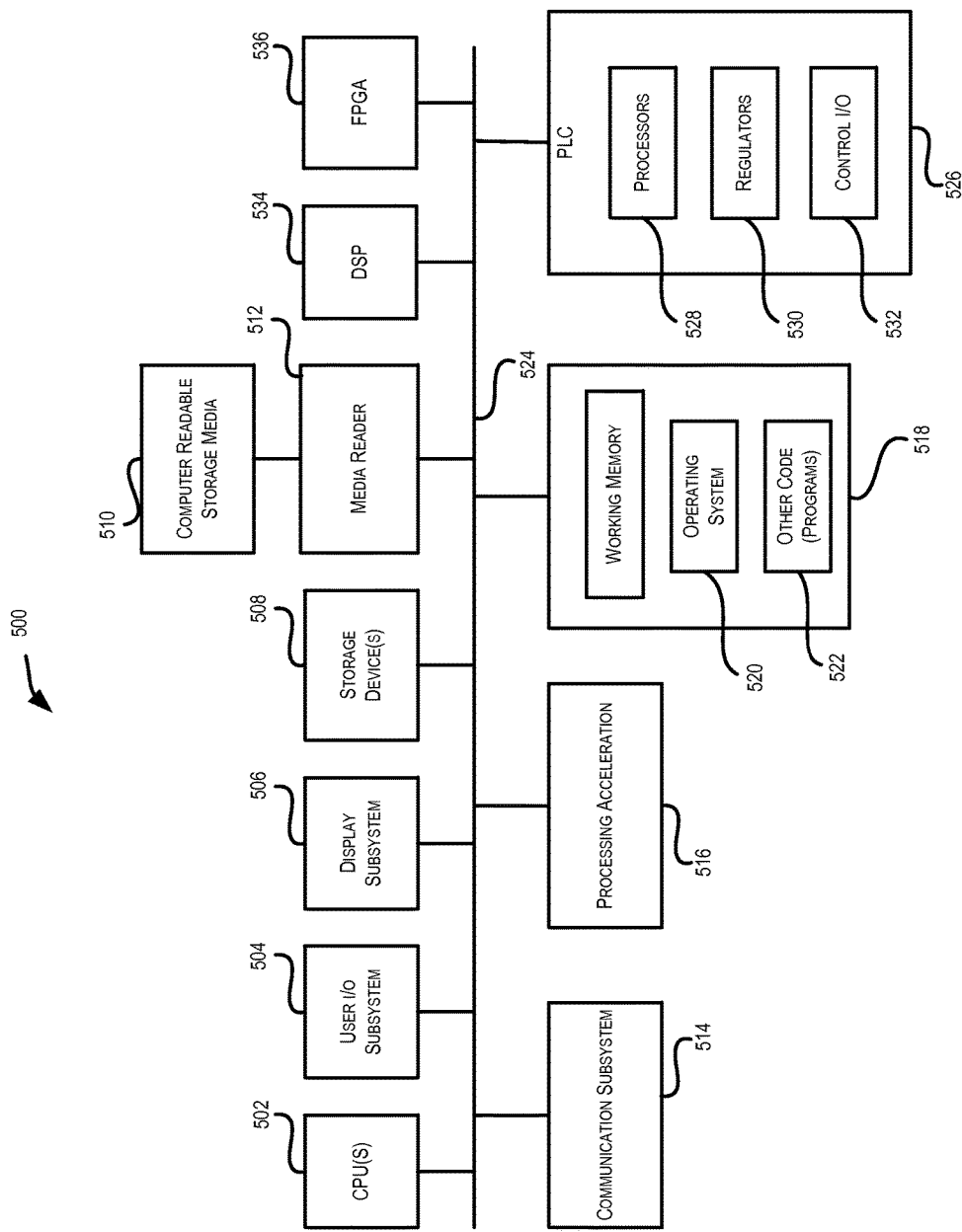
FIG. 5 shows a system for providing acceleration based speed control, in accordance with an embodiment of the invention.

FIG. 5 shows a system for providing acceleration based speed control, in accordance with an embodiment of the invention. FIG. 5 is a simplified block diagram of a computing system 500 that may be used in accordance with embodiments of the present invention. In accordance with an embodiment, computing system 500 can be incorporated into a device, such as motor controller 106, described above.

Computer system 500 is shown comprising hardware elements that may be electrically coupled via a bus 524. The hardware elements may include one or more central processing units (CPUs) 502, one or more input devices 504 (e.g., a mouse, a keyboard, touchscreen, etc.), and one or more output devices 506 (e.g., a display device, a printer, etc.). The CPUs may include single or multicore CPUs. The computer system may also include a programmable logic controller (PLC) 526 that may be used to provide the above-described control functionality to a motor or other process being controlled. The PLC 526 can include one or more processors 528 which may execute software regulators 530 (e.g., PI, PID, and/or any other software implemented regulator) based on one or more received signals 532 (e.g., measured speed, torque, and/or power) from the motor or other process and provide one or more control outputs 532 to control the motor or other process. In some embodiments, the software controller 526 may use CPUs 502, digital signal processors (DSPs) 534, and/or field programmable gate arrays (FPGAs) 536 or any other processing systems or components. Computer system 500 may also include one or more storage devices 508. By way of example, the storage device(s) 508 may include devices such as disk drives, optical storage devices, and solid-state storage devices such as a random access memory (RAM), a read-only memory (ROM), and/or Electrically Erasable Programmable Read-Only Memory (EEPROM), which can be programmable, flash-updateable and/or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, Field Programmable Gate Array (FPGA) and/or the like.

Computer-readable storage media reader 512 can further be connected to a computer-readable storage medium 510, together (and, optionally, in combination with storage device (s) 508) comprehensively representing remote, local, fixed, and/or removable storage devices plus storage media for temporarily and/or more permanently containing computer-readable information. Communications system 514 may permit data to be exchanged with a wireless or wired network and/or any other computer connected to that network.

Computer system 500 may also comprise software elements, shown as being currently located within working memory 518, including an operating system 520 and/or other code 522, such as an application program (which may be a client application, Web browser, etc.). It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, Compact Disc Read-only memory (CD-ROM), digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

As used herein and in the appended claims, the singular forms "a", "an", and "the" include plural references unless the context clearly dictates otherwise. Thus, for example, reference to "a processor" includes a plurality of such devices, and reference to "the subsystem" includes references to one or more subsystems and equivalents thereof known to those skilled in the art, and so forth.

What is claimed is:

1. A method, comprising:
measuring, by a speed sensor, an output speed of a motor;
receiving, by an acceleration estimator, the output speed;
determining, by the acceleration estimator, an acceleration estimate based on the output speed;
determining, by the acceleration estimator, that the acceleration estimate is outside a preset range;
calculating, by the acceleration estimator, a speed estimate based on a maximum acceleration value from the preset range;
generating a speed set point based on the speed estimate;
determining a speed error signal based on the speed set point and the output speed;
outputting, by a speed regulator, a speed control signal based on the speed error signal;
comparing the speed control signal from the speed regulator and a plurality of different control signals, wherein at least one of the different control signals is from a torque regulator or a power regulator of the motor;
based on relative magnitudes of the speed control signal and the plurality of different control signals, selecting a control signal having a lowest magnitude from the speed control signal and the plurality of different control signals to output to the motor; and
limiting an acceleration of the motor based on the relative magnitudes of the speed control signal and the plurality of different control signals by driving the motor with control circuitry that limits the acceleration of the motor according to the selected control signal.

2. The method of claim 1, further comprising:
outputting an override signal to limit the acceleration of the motor based on a difference between the output speed and the speed estimate.

3. The method of claim 2, further comprising:
determining that the acceleration estimate is no longer outside the preset range; and
reducing the override signal to zero over a first time period.

4. The method of claim 2, further comprising:
limiting an output range of the speed estimate; and
outputting the override signal to limit speed when the speed estimate is limited to the output range.

5. The method of claim 4, wherein when the acceleration estimate is outside the preset range, outputting the difference between the control signal and the override signal to the motor.

6. The method of claim 1, wherein the plurality of different control signals includes a torque control signal and a power control signal.

7. A system comprising:
an electric motor;
controller circuitry configured to receive a plurality of reference signals and a plurality of output signals from the electric motor, and further configured to drive the electric motor according to a control signal that limits an acceleration of the electric motor, wherein the controller circuitry comprises a plurality of regulators and an acceleration estimator,
wherein the acceleration estimator is configured to:
receive an output speed signal of an output speed of the electric motor detected by a speed sensor;
determine an acceleration estimate based on the output speed signal;
determine that the acceleration estimate is outside a preset range; and
calculate a speed set point based on a maximum acceleration value from the preset range; and
wherein a speed regulator from the plurality of regulators is configured to:
receive a speed error signal based on the speed set point and the output speed; and
output a speed control signal based on the speed error signal; and
a minimum selector module configured to:
receive the speed control signal and a plurality of different control signals;
compare the speed control signal and the plurality of different control signals, wherein at least one of the different control signals is from a torque regulator or a power regulator of the electric motor; and
based on relative magnitudes of the speed control signal and the plurality of different control signals, select the control signal having a lowest magnitude from the speed control signal and the plurality of different control signals to output to the electric motor.

8. The system of claim 7, wherein the acceleration estimator is further configured to:
output an override signal to limit the acceleration of the electric motor based on a difference between the output speed and the speed set point.

9. The system of claim 8, wherein the acceleration estimator is further configured to:
determine that the acceleration estimate is no longer outside the preset range; and
reduce the override signal to zero over a first time period.

10. The system of claim 8, further comprising a summer configured to receive the control signal and the override signal, wherein when the acceleration estimate is outside the preset range, the summer outputs the difference between the control signal and the override signal to the electric motor.

11. The system of claim 7 wherein the plurality of different control signals includes a torque control signal corresponding to the torque regulator and a power control signal corresponding to the power regulator.

12. An acceleration estimator of a motor, comprising:
a first limiting regulator configured to output values in a preset range, wherein the first limiting regulator:
receives an error signal representing a difference between an output speed of an electric motor detected by a speed sensor and a speed set point; and
outputs an acceleration estimate, wherein the acceleration estimate is limited to the preset range;
a second limiting regulator configured to output an override signal; and
an integrator that receives the acceleration estimate from the first limiting regulator and outputs the speed set point,
wherein the motor is controlled by control circuitry using a control signal derived from combining the override signal with a lowest magnitude signal selected from a speed control signal from a speed regulator, a torque control signal from a torque regulator, and a power control signal from a power regulator of the motor, and wherein the control signal limits an acceleration of the motor.

13. The acceleration estimator of claim 12, wherein the first limiting regulator determines that the acceleration estimate is outside the preset range and sends a limiting signal to the second limiting regulator causing the second limiting regulator to output the override signal.

14. The acceleration estimator of claim 13, wherein the first limiting regulator determines that the acceleration estimate is no longer outside the preset range and stops sending the limiting signal to the second limiting regulator, causing the override signal reduce to zero over a time period.

15. The acceleration estimator of claim 14, wherein a length of the time period is determined based on a feedback gain value of the second limiting regulator.

16. The acceleration estimator of claim 12, wherein the second limiting regulator receives the error signal and outputs the override signal based on the error signal.

* * * * *